(12) United States Patent
Ore et al.

(10) Patent No.: US 11,091,018 B2
(45) Date of Patent: Aug. 17, 2021

(54) POWERTRAIN WITH VARIABLE VERTICAL DROP DISTANCE

(71) Applicant: Deere & Company, Moline, IL (US)

(72) Inventors: Thomas G. Ore, Cedar Falls, IA (US); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 732 days.

(21) Appl. No.: 15/977,242

(22) Filed: May 11, 2018

(65) Prior Publication Data
US 2019/0346036 A1  Nov. 14, 2019

(51) Int. Cl.
| | |
|---|---|
| *B60K 6/08* | (2006.01) |
| *B60K 6/365* | (2007.10) |
| *B60K 6/543* | (2007.10) |
| *B60K 6/445* | (2007.10) |

(Continued)

(52) U.S. Cl.
CPC ............... *B60K 6/08* (2013.01); *B60K 6/365* (2013.01); *B60K 6/40* (2013.01); *B60K 6/445* (2013.01); *B60K 6/543* (2013.01); *F16H 37/0826* (2013.01); *B60Y 2200/92* (2013.01); *F16H 37/0806* (2013.01); *Y10S 903/911* (2013.01); *Y10S 903/918* (2013.01)

(58) Field of Classification Search
None
See application file for complete search history.

(56) References Cited

U.S. PATENT DOCUMENTS

| | | | |
|---|---|---|---|
| 3,214,987 A | 11/1965 | Schenck et al. | |
| 3,626,787 A | 12/1971 | Singer | |
| 3,651,904 A | 3/1972 | Snoy et al. | |

(Continued)

FOREIGN PATENT DOCUMENTS

| | | |
|---|---|---|
| CN | 101255907 A | 9/2008 |
| CN | 102844588 A | 12/2012 |

(Continued)

OTHER PUBLICATIONS

German Search Report for German application No. 102020202651.3 dated Sep. 1, 2020.

(Continued)

*Primary Examiner* — Dirk Wright
(74) *Attorney, Agent, or Firm* — Klintworth & Rozenblat IP LLP

(57) ABSTRACT

A powertrain for a work vehicle includes an engine, a continuously variable power source (CVP), an output shaft, and a transmission. The transmission operably connects the engine and the CVP to the output shaft. The transmission is configured to provide selection between a plurality of transmission modes in which the transmission transmits power from at least one of the engine and the CVP to the output shaft. The transmission includes an input assembly defining an input axis, a variator assembly defining a variator axis, a countershaft assembly defining a countershaft axis, and an output assembly defining an output axis. The input assembly, the variator assembly, the countershaft assembly, and the output assembly are the same in different orientations. A vertical drop distance from the input axis to the output axis varies between the different ones of the plurality of orientations.

20 Claims, 3 Drawing Sheets

(51) Int. Cl.
*F16H 37/08* (2006.01)
*B60K 6/40* (2007.10)

(56) References Cited

U.S. PATENT DOCUMENTS

| | | | |
|---|---|---|---|
| 3,714,845 | A | 2/1973 | Mooney, Jr. |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,156,577 | A | 10/1992 | Fredriksen et al. |
| 5,353,662 | A | 10/1994 | Vaughters |
| 5,508,574 | A | 4/1996 | Vlock |
| 5,931,757 | A | 8/1999 | Schmidt |
| 6,394,925 | B1 | 5/2002 | Wontner et al. |
| 6,478,705 | B1 | 11/2002 | Holmes et al. |
| 6,684,148 | B2 | 1/2004 | Chess |
| 7,008,342 | B2 | 3/2006 | Dyck et al. |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,734,281 | B2 | 5/2014 | Ai et al. |
| 8,747,266 | B2 | 6/2014 | Aitzetmueller |
| 8,784,246 | B2 | 7/2014 | Treichel |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,097,342 | B2 | 8/2015 | Dix et al. |
| 9,206,885 | B2 | 12/2015 | Rekow et al. |
| 9,487,073 | B2 | 11/2016 | Love |
| 9,562,592 | B2 | 2/2017 | Rekow et al. |
| 9,944,163 | B2 | 4/2018 | McKinzie |
| 9,981,665 | B2 | 5/2018 | Rekow et al. |
| 10,119,598 | B2 | 11/2018 | Rekow et al. |
| 10,647,193 | B2 * | 5/2020 | McKinzie ............... F16H 3/728 |
| 10,655,710 | B2 * | 5/2020 | Rekow .................. B60W 30/19 |
| 10,670,124 | B2 * | 6/2020 | Rekow ................... F16H 61/66 |
| 2003/0186769 | A1 | 10/2003 | Ai et al. |
| 2004/0094381 | A1 | 5/2004 | Versteyhe |
| 2005/0049100 | A1 | 3/2005 | Ai et al. |
| 2006/0046886 | A1 | 3/2006 | Holmes et al. |
| 2006/0111212 | A9 | 5/2006 | Ai et al. |
| 2006/0142104 | A1 | 6/2006 | Saller |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2008/0171626 | A1 | 7/2008 | Pollman |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller |
| 2013/0023370 | A1 | 1/2013 | Grad et al. |
| 2013/0123055 | A1 | 5/2013 | Mattsson et al. |
| 2014/0018201 | A1 | 1/2014 | Tolksdorf |
| 2014/0128196 | A1 | 5/2014 | Rintoo |
| 2014/0248986 | A1 | 9/2014 | Weeramantry et al. |
| 2014/0315685 | A1 | 10/2014 | Holler |
| 2015/0006007 | A1 | 1/2015 | Kitahata |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 | 9/2016 | Watanabe et al. |
| 2017/0102059 | A1 | 4/2017 | Rekow et al. |
| 2017/0284508 | A1 | 10/2017 | Devreese |
| 2017/0284517 | A1 | 10/2017 | Rekow et al. |
| 2017/0328453 | A1 | 11/2017 | McKinzie et al. |
| 2018/0043764 | A1 | 2/2018 | McKinzie et al. |
| 2018/0149247 | A1 | 5/2018 | Rekow et al. |
| 2018/0298993 | A1 | 10/2018 | Fliearman et al. |
| 2019/0337376 | A1 * | 11/2019 | Ore ........................ B60K 6/365 |

FOREIGN PATENT DOCUMENTS

| | | | |
|---|---|---|---|
| DE | 1173348 | B | 7/1964 |
| DE | 4010919 | A1 | 10/1991 |
| DE | 19621200 | A1 | 11/1997 |
| DE | 19954636 | A1 | 5/2001 |
| DE | 10128076 | A1 | 12/2002 |
| DE | 10319252 | A1 | 11/2004 |
| DE | 112006002537 | T5 | 9/2008 |
| DE | 202009007972 | U1 | 6/2010 |
| DE | AT11545 | U1 | 12/2010 |
| DE | 102010026460 | A1 | 3/2011 |
| DE | 102012216781 | A1 | 3/2011 |
| DE | 102008032320 | A1 | 6/2011 |
| DE | 102010021846 | A1 | 12/2011 |
| DE | 10201102210 | A1 | 7/2012 |
| DE | 102011102184 | A1 | 7/2012 |
| DE | 10201105868 | A1 | 1/2013 |
| DE | 102011115002 | A1 | 4/2013 |
| DE | 102013220167 | A1 | 4/2015 |
| DE | 202015102282 | U1 | 6/2015 |
| DE | 19214225298 | A1 | 7/2015 |
| DE | 102015215461 | A1 | 2/2016 |
| DE | 102015220635 | A1 | 5/2016 |
| DE | 102015200973 | A1 | 7/2016 |
| DE | 102015205932 | A1 | 10/2016 |
| DE | 102016120965 | A1 | 5/2017 |
| DE | 102016204727 | A1 | 9/2017 |
| DE | 102006041160 | A1 | 9/2018 |
| DE | 102018108510 | A1 | 10/2018 |
| DE | 102018212712 | A1 | 1/2019 |
| DE | 102018213871 | A1 | 2/2020 |
| EP | 805059 | A2 | 5/1997 |
| EP | 1099882 | A2 | 5/2001 |
| EP | 1707416 | B1 | 8/2007 |
| EP | 02466168 | | 6/2012 |
| EP | 02466169 | | 6/2012 |
| EP | 2855226 | B1 | 9/2018 |
| JP | 6462174 | B1 * | 1/2019 ............ F16D 65/18 |
| WO | 2008019799 | A2 | 2/2008 |
| WO | 2011092643 | A1 | 8/2011 |
| WO | 2012171812 | | 12/2012 |
| WO | WO-2017107848 | A1 * | 6/2017 ............ F16H 3/728 |

OTHER PUBLICATIONS

USPTO Final Office Action issued in Utility U.S. Appl. No. 15/971,867 dated Jun. 24, 2020.
German Search Report for application No. 102019205211 dated Sep. 5, 2019.
USPTO, Non-Final Office Action issued in U.S. Appl. No. 16/555,913 dated Jan. 4, 2021.
Deere & Company, (Rekow et al.) pending Utility U.S. Appl. No. 15/879,796, Multi-Mode Infinitely Variable Transmission, filed Jan. 25, 2018.
USPTO, Non-Final Office Action issued in pending Utility U.S. Appl. No. 15/971,867 dated Dec. 12, 2019.

(56) References Cited

OTHER PUBLICATIONS

German Search Report for application No. 102019204706.8 dated Dec. 17, 2019.
USPTO, Office Action in U.S. Appl. No. 16/371,598 dated Jul. 21, 2020.
USPTO, Non-Final Office Action issued in pending Utility U.S. Appl. No. 15/628,979 dated Nov. 5, 2019.
Deere & Company, Utility U.S. Appl. No. 15/971,867, filed May 4, 2018.
Deere & Company, Utility U.S. Appl. No. 16/371,598, filed Apr. 1, 2019.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
CNIPA Office Action for Application No. 201510165982.4 dated Aug. 9, 2018, Serial Notice No. 2018080601675890.
USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 14/249,258 dated Apr. 21, 2017.
USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
German Search Report issued in application No. 102020213675.0 dated Mar. 17, 2021. (10 pages).
USPTO, Final Office Action issued in U.S. Appl. No. 16/555,913 dated Apr. 20, 2021.
German Search Report issued in counterpart application No. 102020209003.3 dated Apr. 15, 2021 (10 pages).
German Search Report issued in counterpart application No. 102017220666.7 dated May 28, 2021 (10 pages).

* cited by examiner

POWERTRAIN WITH VARIABLE VERTICAL DROP DISTANCE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to powertrains, including multimode powertrains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and at least one continuously variable power source ("CVP") (e.g., an electric motor/generator or hydraulic motor/pump, and so on) to provide useful power to an output member. For example, a portion of engine power may be diverted to drive a first CVP, which may in turn drive a second CVP. Power from the engine and/or the second CVP may be delivered to the output member (e.g., a vehicle axle or other output shaft). The engine, the CVP(s), and the output member may be operatively connected via an infinitely variable transmission ("IVT") or continuously variable transmission ("CVT").

Many CVTs have disadvantages. For example, some CVTs may not provide sufficient power delivery for some operating conditions. Other CVTs may decrease operating efficiency, causing the fuel consumption to be high. Also, some CVTs may be overly complicated, may contain an excessive amount of parts, and/or may be difficult to assemble and repair. As such, manufacture and maintenance of these CVTs may be inefficient. Furthermore, these CVTs may be bulky and packaging the CVT on a work vehicle can be difficult.

SUMMARY OF THE DISCLOSURE

A powertrain for a work vehicle is disclosed that includes an engine, a continuously variable power source (CVP), an output shaft, and a transmission. The transmission operably connects the engine and the CVP to the output shaft. The transmission is configured to provide selection between a plurality of transmission modes in which the transmission transmits power from at least one of the engine and the CVP to the output shaft. The transmission includes an input assembly defining an input axis and having at least one input transmission component that is supported for rotation about the input axis. The engine is connected to the input assembly and is configured to input engine power thereto for rotating the at least one input transmission component. The CVP is connected to the input assembly and is configured to input CVP power thereto for rotating the at least one input transmission component. The transmission further includes a variator assembly defining a variator axis. The variator assembly includes a variator with at least one variator component that is supported for rotation about the variator axis. The variator assembly in at least one of the plurality of transmission modes is configured to receive engine power and CVP power via the input assembly and to output combined power. Also, the transmission includes a countershaft assembly defining a countershaft axis and including at least one countershaft component that is supported for rotation about the countershaft axis. The countershaft assembly is configured to receive combined power from the variator for rotating the at least one countershaft component. Additionally, the transmission includes an output assembly defining an output axis. The output assembly is connected to the output shaft. The output assembly is configured to receive combined power from the countershaft assembly to drive the output shaft in rotation about the output axis. The input axis, the variator axis, the countershaft axis, and the output axis are substantially parallel and arranged in a series that extends vertically. The series has a plurality of orientations in which the input assembly, the variator assembly, the countershaft assembly, and the output assembly are alternatively arranged. The input assembly, the variator assembly, the countershaft assembly, and the output assembly are the same in different ones of the plurality of orientations and a vertical drop distance from the input axis to the output axis varies between the different ones of the plurality of orientations.

Also, a method of manufacturing a powertrain for a work vehicle is disclosed. The method includes providing an engine, a continuously variable power source (CVP), and an output shaft. The method also includes providing a transmission configured to operably connect the engine and the CVP to the output shaft. The transmission is configured to provide selection between a plurality of transmission modes in which the transmission transmits power from at least one of the engine and the CVP to the output shaft. The transmission includes an input assembly defining an input axis and has at least one input transmission component that is supported for rotation about the input axis. The engine is connected to the input assembly and is configured to input engine power thereto for rotating the at least one input transmission component. The CVP is connected to the input assembly and is configured to input CVP power thereto for rotating the at least one input transmission component. The transmission also includes a variator assembly defining a variator axis. The variator assembly includes a variator with at least one variator component that is supported for rotation about the variator axis. The variator assembly in at least one of the plurality of transmission modes is configured to receive engine power and CVP power via the input assembly and to output combined power. The transmission further includes a countershaft assembly defining a countershaft axis and includes at least one countershaft component that is supported for rotation about the countershaft axis. The countershaft assembly is configured to receive combined power from the variator for rotating the at least one countershaft component. Additionally, the transmission includes an output assembly defining an output axis. The output assembly is connected to the output shaft. The output assembly is configured to receive combined power from the countershaft assembly to drive the output shaft in rotation about the output axis. The input axis, the variator axis, the countershaft axis, and the output axis are substantially parallel and are arranged in a series that extends vertically. The series has a plurality of orientations in which the input assembly, the variator assembly, the countershaft assembly, and the output assembly are alternatively arranged. The input assembly, the variator assembly, the countershaft assembly, and the output assembly are the same in different ones of the plurality of orientations. A vertical drop distance from the input axis to the output axis varies between the different ones of the plurality of orientations. The method also includes selecting one of the plurality of orientations of the series and arranging the transmission according to the selected one of the plurality of orientations to provide the transmission with the vertical drop distance associated with the selected one of the plurality of orientations.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
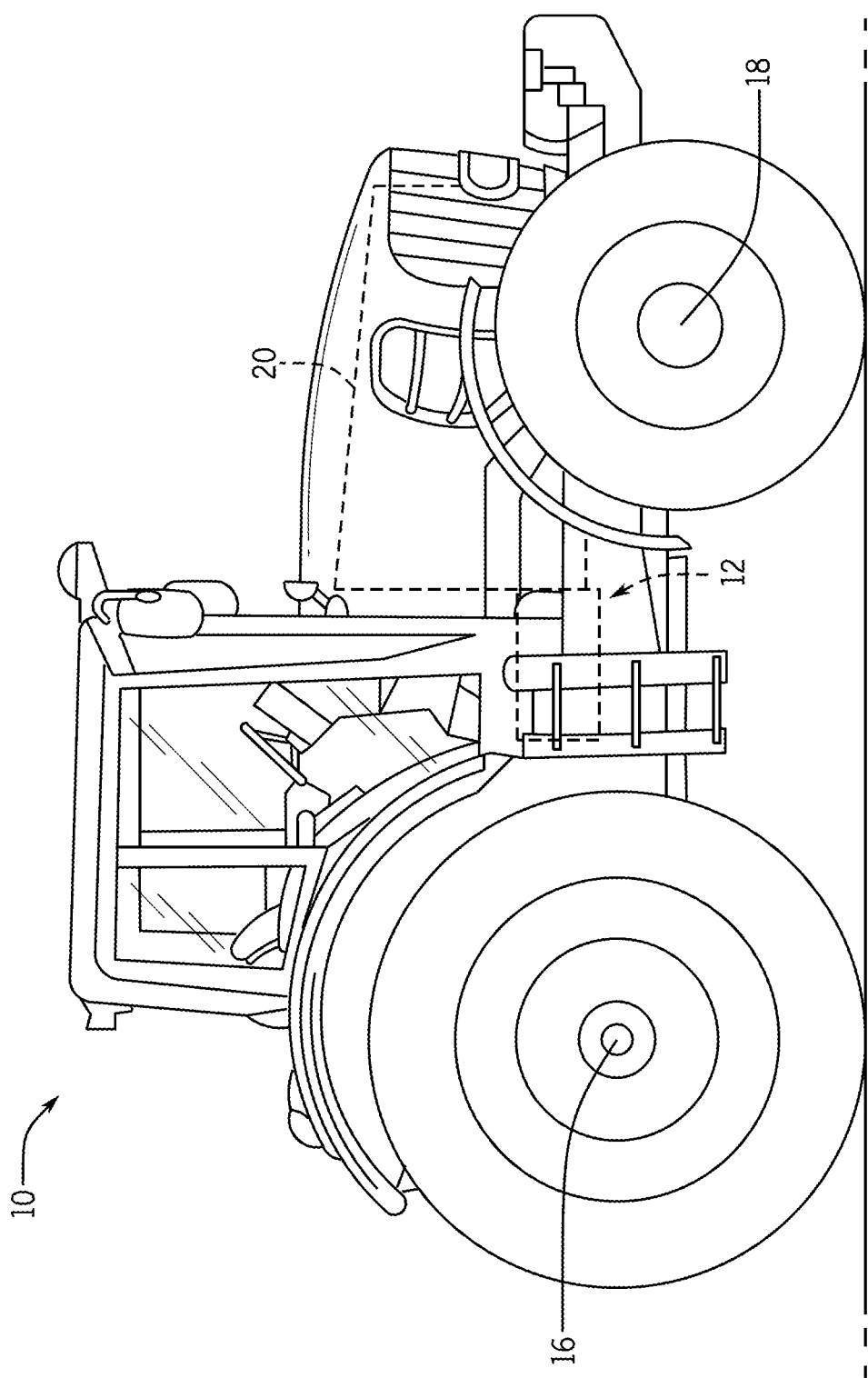
FIG. 1 is a side view of a work vehicle according to example embodiments of the present disclosure.

The following describes one or more example embodiments of the disclosed powertrain (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, powertrain, or power source will be understood to also encompass, in various embodiments, configurations including an "infinitely" variable transmission, powertrain, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if a substantive portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

The continuously variable transmission (CVT) of the present disclosure may provide a plurality of different modes. For example, a "split-path" power transmission mode may be provided, in which power from both the engine and a CVP is combined for delivery of useful power to the output member. This is called "split-path" power transmission because it is split between a direct mechanical path from the engine and an infinitely/continuously variable path through one or more CVPs. In additional embodiments, useful power may be provided by a CVP but not by the engine (except to the extent the engine drives the CVP). This may be referred to as "CVP-only" power transmission or series mode. Finally, in some embodiments, useful power may be provided by the engine (e.g., via various mechanical transmission elements, such as shafts and gears), but not by a CVP. This may be referred to as "mechanical-path" power delivery.

In certain embodiments, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

In the use of continuously (or infinitely) variable powertrains, the relative efficiency of power transmission in various modes may be of some concern. It will be understood, for example, that energy losses may inhere in each step of using a first CVP to convert rotational power from the engine into electrical or hydraulic power, transmitting the converted power to a second CVP, and then converting the transmitted power back to rotational power. In this light, mechanical transmission of power directly from an engine (i.e., in mechanical-path transmission mode) may be viewed a highly efficient mode of power transmission, whereas transmission of power through a CVP (e.g., in a split-path transmission mode or a CVP-only transmission mode) may be less efficient. Accordingly, in certain circumstances it may be desirable to utilize mechanical-path transmission mode rather than a split-path mode or CVP-only mode. However, in other circumstances, the flexibility and other advantages provided by use of CVPs may outweigh the inherent energy losses of a split-path or CVP-only mode.

Among other advantages, the powertrains disclosed herein may usefully facilitate transition between split-path, mechanical-path, and CVP-only modes for a vehicle or other powered platform. For example, through appropriate arrangement and control of various gear sets, shafts and clutches, the disclosed powertrain may allow a vehicle to be easily transitioned between any of the three modes, depending on the needs of a particular operation.

The CVT of the present disclosure may also provide a plurality of modes that provide different output speed ranges. For example, in some embodiments, a first split-path mode and a second split-path mode may be provided. The first split-path mode may provide lower output speed ranges than the second split-path mode.

A control set may be provided for selectively changing between a plurality of modes. The control set may include clutches, brakes, and/or other components that can be selectively engaged and disengaged for changing the mode of the transmission. The control set may enable selective switching between the mechanical-path transmission mode, the split-path mode, and the CVP-only mode.

In some embodiments, an CVT of the present disclosure may include at least one CVP-only mode and at least one split-path field mode. In some embodiments, the CVT may additionally provide at least one mechanical-only mode.

In some embodiments, the CVT may be constructed such that the CVT maintains torque at the output shaft and a rotational speed of zero. This may be referred to as "powered-zero". This mode may also allow the output shaft to rotate at low rotational speeds. This may be referred to as a "creeper mode". In some embodiments, the powered-zero and creeper modes may be CVP-only modes. The CVT may also provide one or more "field modes" for moving the work vehicle at higher speeds. In some embodiments, there may be a plurality of field modes, each providing different ground speed ranges for the work vehicle. Furthermore, in some embodiments, the CVT may provide at least one forward mode (for moving the work vehicle in a forward direction) and at least one reverse mode (for moving the work vehicle is a reverse direction).

The CVT of the present disclosure may provide various advantages. For example, in one arrangement or orientation, the CVT may have a relatively large drop height distance (i.e., a vertical distance measured from the input axis of rotation to the output axis of rotation). In another arrangement/orientation, the CVT may have a relatively short drop height distance. Thus, the CVT may be configured for different work vehicles without the need for re-arranging the interconnection of parts. For example, the position of neighboring rotational axes may have different polar (angular) positions in the different orientations of the CVT as will be discussed. This provides a high degree of design flexibility for the CVT because it may be configured for different work vehicles with different drop height distances. Indeed, the CVT may be relatively compact (i.e., short drop height distance) or may be relatively expansive (i.e., long drop height distance) and, yet, still provide a number of modes as will be discussed in detail below.

As will become apparent from the discussion herein, the disclosed powertrain may be used advantageously in a variety of settings and with a variety of machinery. For example, referring now to FIG. 1, an example of the disclosed powertrains may be included in a work vehicle 10. In FIG. 1, the work vehicle 10 is depicted as a tractor with a powertrain 12 (shown schematically). It will be understood, however, that other configurations may be possible, including configurations with the vehicle 10 as a different kind of tractor, a harvester, a log skidder, a grader, or one of various other work vehicle types. It will further be understood that the disclosed powertrains may also be used in non-work vehicles and non-vehicle applications (e.g., fixed-location power installations).

Generally, the powertrain 12 may be configured to generate power and to transmit the power from an engine 20 and/or other power sources to an output member (e.g., an output shaft). In some embodiments, the powertrain 12 may transmit the power to a rear axle 16 and/or to a front axle 18 of the work vehicle 10. However, the powertrain 12 may be configured for delivering power to a power take-off shaft for powering an implement that is supported on the vehicle 10 or that is supported on a separate vehicle. It will be appreciated that the powertrain 12 may be configured for delivering power to other power sinks without departing from the scope of the present disclosure.

Figure 2:
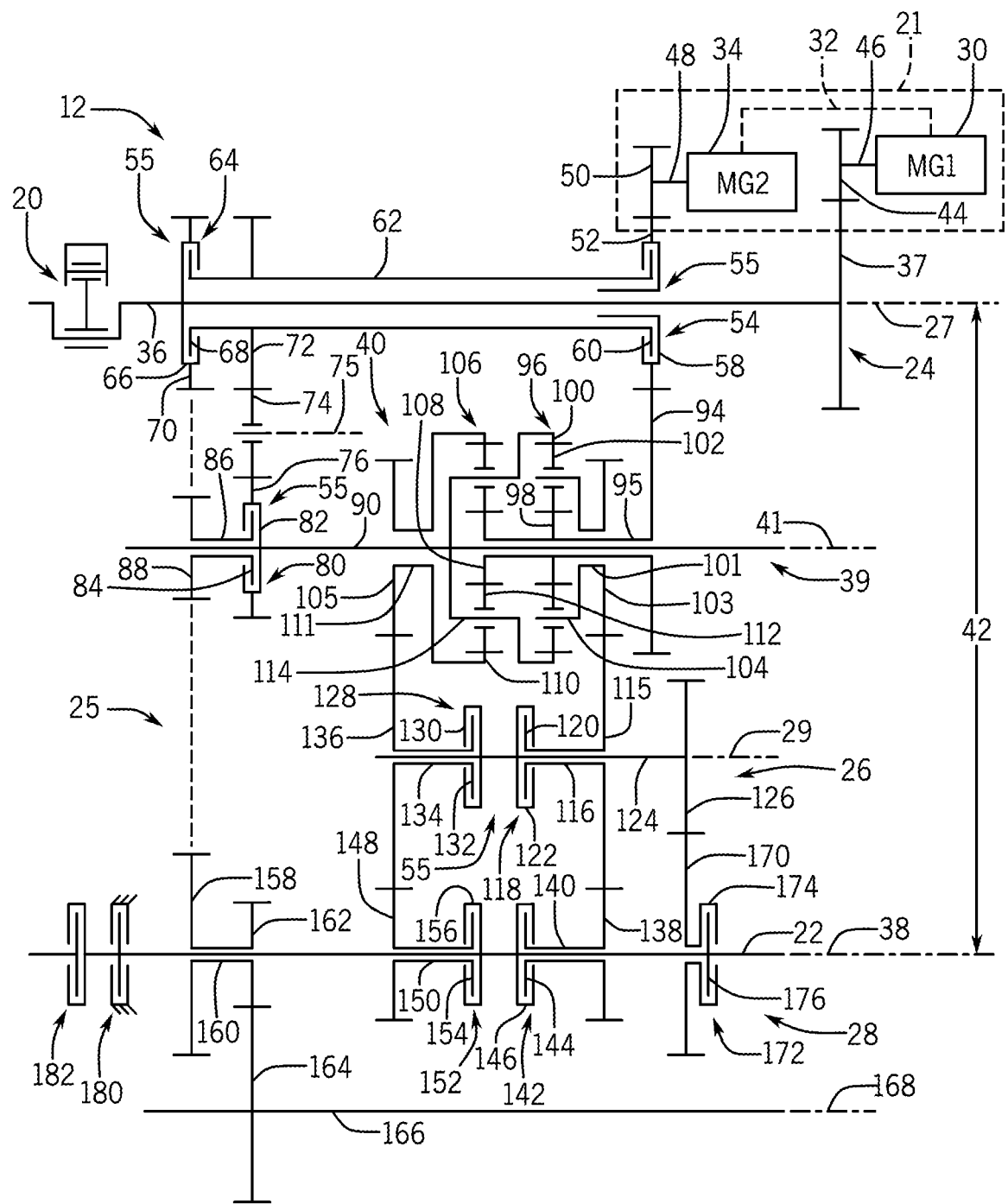
FIG. 2 is a schematic view of a multi-mode continuously variable transmission (CVT) of the present disclosure according to an example embodiment.

Referring now to FIG. 2, an example configuration of the powertrain 12 is depicted schematically. The powertrain 12 may include the engine 20, which may be an internal combustion engine of various known configurations. The powertrain 12 may also include a continuously variable power source CVP 21. The CVP 21 may include at least one continuously variable machine (CVM), such as an electrical machine or a hydraulic machine. In the embodiment shown, the CVP 21 includes a first CVM 30 and a second CVM 34. As shown in FIG. 2, the first CVM 30 may be operably connected to the second CVM 34 via a conduit 32, such as one or more electrical wires.

The powertrain 12 may also include an output shaft 22 or other output member. The output shaft 22 may comprise or may be directly connected to one or more power sinks (e.g., one or both axles 16, 18, power take-off ("PTO") shafts, and so on) of the vehicle 10. In certain embodiments, a torque converter or other device may be included between the engine 20 and the shaft 22 (or another shaft (not shown)), although such a device is not necessary for the operation of the powertrain 12, as contemplated by this disclosure. Further, in certain embodiments, multiple shafts (not shown), including various shafts interconnected by various gears or other power transmission components, or equivalent power transmission components (e.g., chains, belts, and so on) may be included.

The powertrain 12 may further include a transmission 25. The transmission may include a plurality of components, such as shafts, gears, gearsets, clutches, brakes, and/or other components that interconnect the engine 20, the CVP 21, and the output shaft 22 as will be discussed in detail below. The transmission 25 may be considered a continuously variable transmission or an infinitely variable transmission. Also, the transmission 25 may be configured to provide selection between one of the plurality of transmission modes in which the transmission 25 transmits power from the engine 20 and/or the CVP 21 to the output shaft 22.

Accordingly, the engine 20 may provide rotational power to the output shaft 22 via the transmission 25. The engine 20 may also provide rotational power to the first CVM 30 via the transmission 25. Continuing, the first CVM 30 may convert the received power to an alternate form (e.g., electrical or hydraulic power) for transmission over the conduit 32. This converted and transmitted power may be received by the second CVM 34 and then re-converted by the second CVM 34 to provide a rotational power output. Various known control devices (not shown) may be provided to regulate such conversion, transmission, re-conversion and so on.

In some embodiments, the first CVM 30 and the second CVM 34 are both electrical machines. Also, in some embodiments, the first and/or second CVMs 30, 34 may be configured to operate as a motor (to output mechanical power from electrical input power) and as a generator (to output electrical power from mechanical input power).

Generally, in some embodiments, the transmission 25 may include an input assembly 24 defining an input axis 27. The input assembly 24 may be substantially centered with respect to the input axis 27. The input axis 27 may represent an axis of rotation for the input assembly 24. Accordingly, the input assembly 24 may include at least one component (an input transmission component) that is supported for rotation about the input axis 27. As will be discussed, the engine 25 and the CVP 21 may be operatively connected to the input assembly 24.

The transmission 25 may also include a variator assembly 39 defining a variator axis 41. The variator assembly 39 may be substantially centered with respect to the variator axis 41. The variator axis 41 may represent an axis of rotation for the variator assembly 39. Accordingly, the variator assembly 39 may include at least one component (a variator component) that is supported for rotation about the variator axis 41.

The variator assembly 39 may include a variator 40 that is operably connected to the engine 20 and the CVP 21. Generally, the variator 40 may include a variety of devices capable of summing the mechanical inputs from the engine 20 and the CVP 21 for a combined mechanical output to the output shaft 22 for split-path power transmission. In certain embodiments, as depicted in FIG. 2, the variator 40 may be configured as a summing planetary gear set (e.g., a double planetary gear set). It will be understood, however, that other configurations may be possible.

The transmission 25 may further include countershaft assembly 26 defining a countershaft axis 29. The countershaft assembly 26 may be substantially centered with respect to the countershaft axis 29. The countershaft axis 29 may represent an axis of rotation for the countershaft assembly 26. Accordingly, the countershaft assembly 26 may include at least one component (a countershaft component) that is supported for rotation about the countershaft axis 29. The countershaft assembly 26 may be configured for changing rotational direction of the power delivered from the variator assembly 39.

Furthermore, the transmission 25 may include an output assembly 28 defining an output axis 38. The output assembly 28 may be substantially centered with respect to the output axis 38. The output axis 38 may represent an axis of rotation for the output assembly 28. Accordingly, the output assembly 28 may include at least one component (an output component) that is supported for rotation about the output axis 38. The output assembly 28 may be operatively connected to the output shaft 22. As such, the output assembly 28 may deliver power from the countershaft assembly 26 to the output shaft 22.

In some embodiments, the variator assembly 39 may be disposed between and operatively connected to the input assembly 24 and the countershaft assembly 26. Also, the countershaft assembly 26 may be disposed between and operatively connected to the variator assembly 39 and the output assembly 28. As such, the transmission 25 may be configured for power flow through the transmission 25 along a path from the input assembly 24, through the variator assembly 39 and the countershaft assembly 26, to the output assembly 28.

In some embodiments, the input axis 27, the variator axis 41, the countershaft axis 29, and the output axis 38 may be substantially parallel and spaced apart at a distance from each other. The axes 27, 41, 29, 38 may be arranged in a series that extends generally vertically as shown in FIGS. 3-6. In each, the series may include, in vertically descending order, the input axis 27 above the others, then the variator axis 41 below the input axis 27, then the countershaft axis 29 below the input axis 27, and then the output axis 38 below the others.

Figure 3:
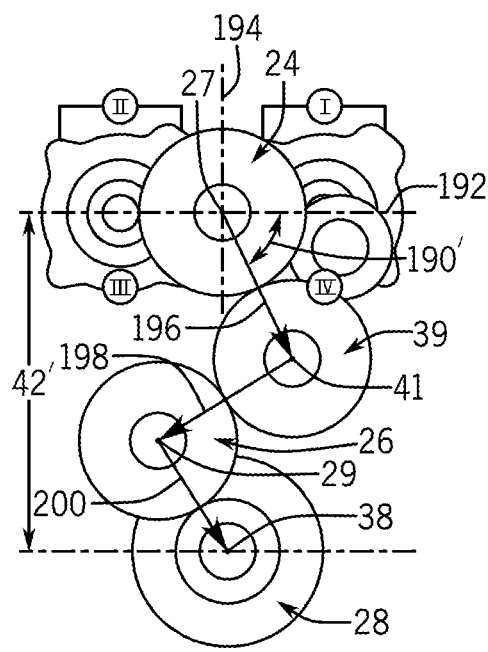
FIG. 3 is a schematic end view of the CVT of FIG. 2 in a first orientation.
Figure 4:
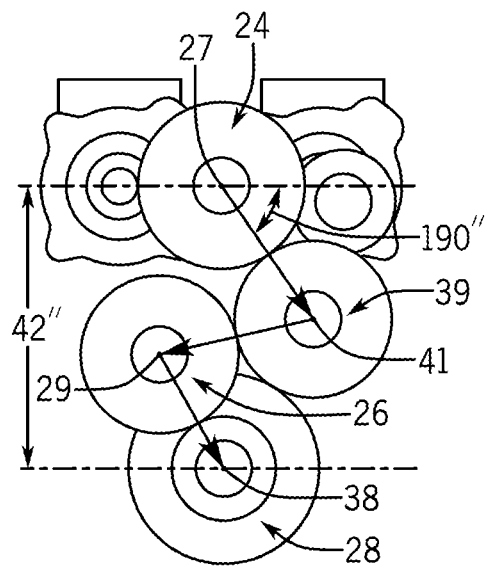
FIG. 4 is a schematic end view of the CVT of FIG. 2 in a second orientation.

The series may have a number of different orientations, four of which are represented in FIGS. 3-6 (i.e., FIG. 3 may represent a first orientation of the series, FIG. 4 may represent a second orientation, and so on). The input assembly 24, the variator assembly 39, the countershaft assembly 26, and the output assembly 28 may be substantially the same in each of the different orientations, except the relative positions of the axes 27, 41, 29, 38 may be different in the various orientations. For example, the angular position of the variator axis 41 relative to the neighboring input axis 27 (as measured with respect to a polar coordinate system) may be different in the different orientations. This will be discussed in greater detail below.

Figure 5:
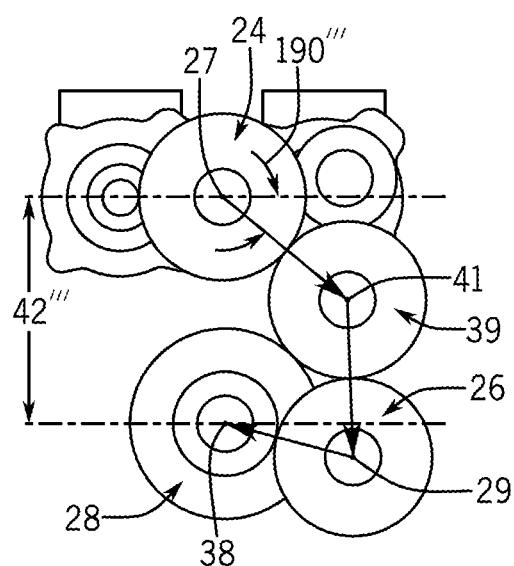
FIG. 5 is a schematic end view of the CVT of FIG. 2 in a third orientation.

As shown in FIG. 2, the transmission 25 may have a vertical drop distance 42, which is measured from the input axis 27 to the output axis 38. The vertical drop distance 42 may vary between the different orientations as shown in FIGS. 3-6. The vertical drop distance 42' in the first orientation of FIG. 3 is greater than that of the vertical drop distance 42" in the second orientation of FIG. 4. Moreover, the vertical drop distance 42" in the second orientation of FIG. 4 is greater than that of the vertical drop distance 42''' in the third orientation of FIG. 5. Additionally, the vertical drop distance 42''' in the third orientation of FIG. 5 is greater than that of the vertical drop distance 42'''' in the fourth orientation of FIG. 6. Accordingly, as will be discussed, the transmission 25 may be configured for different work vehicles with different drop height and/or other packaging requirements.

The transmission 25 may be configured as a multi-mode transmission and may provide selective shifting between the different modes. For example, the transmission 25 may provide one or more split-path power transmission modes. In each of these modes, power from the engine 20 and the CVP 21 may be combined or summed (e.g., by the variator 40), and the resulting combined/summed power may be delivered to the output shaft 22. In one split-path mode, the output shaft 22 may be rotated within a first speed range, and in another split-path mode, the output shaft 22 may be rotated within a second speed range. The second speed range may be higher than the first speed range in some embodiments. There may be additional split-path modes providing other speed ranges for the output shaft 22 as well.

Additionally, the transmission 25 may provide one or more CVP-only modes. For example, in some embodiments, the transmission 25 may, in a sense, disconnect the engine 20 from the output shaft 22 and instead deliver CVP power from the CVP 21 to the output shaft 22. In some embodiments, the speed range for the output shaft 22 during a CVP-only mode may be relatively low. For example, the transmission 25 may provide a CVP-only mode at which torque is maintained at the output shaft 22 while the output shaft 22 remains stationary (i.e., angular velocity of zero). This may be referred to as "powered zero". The output shaft 22 may be driven at relatively low speeds (i.e., "creeper speeds") as well in this CVP-only mode.

As shown in FIG. 2, the transmission 25 may include a control set 55 with a plurality of selective transmission components for selecting between the different transmission modes. The selective transmission components of the control set 55 may include wet clutches, dry clutches, dog collar clutches, brakes, or other similar components that may selectively move between an engaged position and a disengaged position. More specifically, a representative selective transmission component may include a first member and a second member that may engage each other (i.e., fixedly attach together for rotation as a unit) and, alternatively, disengage from each other (i.e., detach to allow relative rotation between the two). Although not shown, the control set 55 may be connected to a known control system for controlling actuation of the individual transmission components.

Accordingly, as will be discussed further, the transmission 25 may provide effective power transmission across a number of modes such that the powertrain 12 is highly efficient. As a result, the transmission 25 may enhance fuel efficiency of the work vehicle 10. Also, the transmission 25 may be relatively compact and may have a relatively simple design and assembly. Additionally, the transmission 25 may be highly configurable and may have a plurality of orientations such that the transmission 25 may be tailored for a particular work vehicle 10 (e.g., to meet a requirement for a particular drop height distance 42 or other packaging requirement).

Referring now to FIG. 2, the transmission 25 will be discussed in detail according to example embodiments. In some embodiments, the engine 20 may include an engine shaft 36 that is supported for rotation about the input axis 27. A first gear 37 may be fixed for rotation on the shaft 36 at an end opposite the engine 20. The first gear 37 may be enmeshed with a second gear 44. The second gear 44 may be fixed for rotation on a first CVM shaft 46. The first CVM shaft 46 may be connected to the first CVM 30. The first CVM shaft 46 may be considered an input shaft for delivering mechanical power to the first CVM 30. The first CVM shaft 46 may also be parallel and spaced at a distance from the input axis 27.

The second CVM 34 may also include a second CVM shaft 48. The second CVM shaft 48 may be considered the output shaft of the second CVM 34 and may be driven in rotation about an axis that is spaced apart from and parallel to the input axis 27. A third gear 50 may be fixed for rotation on the second CVM shaft 48. The third gear 50 may be enmeshed with a fourth gear 52.

The transmission 25 may further include a first clutch 54 of the control set 55. The first clutch 54 may be referred to as a "creeper clutch" in some embodiments. The first clutch 54 may include at least one first member 58 (e.g., first clutch plate(s)). The first member 58 may be fixed for rotation with the fourth gear 52 about the input axis 27. The first clutch 54 may also include at least one second member 60 (e.g., second clutch plate(s)). The second member 60 may be fixed for rotation on an end of a shaft 62. The shaft 62 may be hollow and may surround and receive a portion of the engine shaft 36, and the shaft 62 may be supported for rotation about the input axis 27. As such, the shaft 62 may be coaxial with the engine shaft 36.

Furthermore, the first clutch 54 may be configured to move between an engaged position and a disengaged position. For example, the first member 58 and the second member 60 engage together in the engaged position for rotation as a unit about the input axis 27. The first member 58 and the second member 60 disconnect to allow relative rotation in the disengaged position.

The transmission 25 may additionally include a second clutch 64 of the control set 55. The second clutch 64 may be referred to as a "reverse clutch" in some embodiments. Like the first clutch 54, the second clutch 64 may include at least one first member 66 and at least one second member 68. The second member 68 may be fixed on an end of the shaft 62 opposite the second member 60. The first member 66 may be fixed to a fifth gear 70 for rotation as a unit about the input axis 27. The first member 66 and the second member 68 of the second clutch 64 may engage to allow power transmission between the shaft 62 and the fifth gear 70. The first and second members 66, 68 may disengage to cut off this power flow.

A sixth gear 72 may be fixed to the shaft 62. The sixth gear 72 may be interposed on the shaft 62 between the first clutch 54 and the second clutch 64. The sixth gear 72 may be enmeshed with an idler gear 74. The idler gear 74 may be supported for rotation about an idler axis 75. The idler axis 75 may be parallel to and spaced apart from the input axis 27.

The idler gear 74 may be enmeshed with a seventh gear 76. The seventh gear 76 is supported for rotation about the variator axis 41, which may be parallel to and spaced apart from both the idler axis 75 and the input axis 27.

Furthermore, the transmission 25 may include a third clutch 80 of the control set 55. The third clutch 80 may be referred to as a "forward clutch" in some embodiments. Like the above-described clutches, the third clutch 80 may include at least one first member 82 and at least one second member 84. The first member 82 may be fixed to the seventh gear 76 for rotation about the second axis 78. The second member 84 may be fixed to an end of a hollow shaft 86. The first member 82 and the second member 84 of the third clutch 80 may engage to allow power transmission between the shaft 86 and the seventh gear 76. The first and second members 82, 84 may disengage to cut off this power transmission path.

Additionally, an eighth gear 88 may be fixed on the hollow shaft 86 on an end opposite the third clutch 80. The eighth gear 88 may be enmeshed with the fifth gear 70.

The transmission 25 may further include a shaft 90 (i.e., a variator center shaft). The shaft 90 may be centered on the variator axis 41 and supported for rotation about the variator axis 41. An end portion of the shaft 90 may be received within the shaft 86 and may be coaxial therewith. The first member 82 of the third clutch 80 may be fixed to the shaft 90 as well.

Furthermore, the transmission 25 may include a ninth gear 94. The ninth gear 94 may be fixed on an end of a hollow shaft 95. The hollow shaft 95 may receive the shaft 90, and both the ninth gear 94 and the hollow shaft 95 may be supported for rotation as a unit about the variator axis 41. The ninth gear 94 may be enmeshed with the fourth gear 52. The hollow shaft 95 may also be operatively attached to the variator 40 as will be discussed.

The transmission 25 may further include the variator 40, which may be substantially centered on and supported for rotation about the variator axis 41. The variator 40 may comprise a planetary gearset in some embodiments. In the illustrated embodiment, the variator 40 may comprise a double planetary gearset. However, it will be appreciated that the variator 40 may vary from the illustrated embodiment without departing from the scope of the present disclosure. Furthermore, it will be appreciated that the variator 40 may include a plurality of variator members, some of which may serve as power inputs and some of which may serve as power outputs, depending on the mode in which the transmission 25 is operating.

In the illustrated embodiment, for example, the variator 40 may include a first planetary gearset 96 (a low planetary gearset) that includes a first sun gear 98, a first ring gear 100, and a plurality of first planet gears 102 with a respective first carrier 104. The first sun gear 98 may be fixed to the shaft 95 for rotation about the variator axis 41. The first planet gears 102 may enmeshed with and disposed between the first sun gear 98 and the first ring gear 100. The first planet gears 102 and the first carrier 104 may be configured to rotate together about the variator axis 41. Likewise, the first ring gear 100 may be centered on and supported for rotation about the variator axis 41

In addition, the variator 40 may include a first output member 101. The first output member 101 may comprise a short, hollow shaft that receives the hollow shaft 95 and the central shaft 90. The first output member 101 may be fixed to the first carrier 104 for rotation therewith about the variator axis 41. A first variator output gear 103 may be fixed on the first output member 101. In some embodiments, the first variator output gear 103 may be disposed axially between the first planetary gearset 96 and the gear 94 with respect to the variator axis 41.

Moreover, the variator 40 may include a second planetary gearset 106 (a hi planetary gearset) that includes a second sun gear 108, a second ring gear 110, and a plurality of second planet gears 112 with an associated second carrier 114. The second sun gear 108 may be fixed to the shaft 95 for rotation about the variator axis 41. The second planet gears 112 may be enmeshed with and disposed between the second sun gear 108 and the second ring gear 110. The second planet gears 112 and the second carrier 114 may be configured to rotate together about the variator axis 41. The second carrier 114 may also be attached to the first ring gear 100. Likewise, the second ring gear 110 may be centered on and supported for rotation about the variator axis 41. In some embodiments, the second carrier 114 may be fixed to the shaft 90. The opposite portion of the second carrier 114 may be fixed to the first ring gear 100.

The variator 40 may also include a second output member 111. The second output member 111 may comprise a short, hollow shaft that receives the central shaft 90. The second output member 111 may be fixed to the second ring gear 110 for rotation therewith about the variator axis 41. A second variator output gear 105 may be fixed on the second output member 111. In some embodiments, the second variator output gear 105 may be disposed axially between the second planetary gearset 106 and the third clutch 80 with respect to the variator axis 41. Thus, in some embodiments, the second variator output gear 105 and the first variator output gear 103 may be disposed on opposite sides of the variator 40.

It is noted that the first clutch 54, the second clutch 64, and the third clutch 80 may be disposed on an input side of the variator 40. Thus, during operation of the powertrain 12, power (from the engine 20 and/or the CVP 21) may be input to the variator 40 via one or more of these clutches 54, 64, 80. The variator 40 may output power via the components that are described below.

For example, the transmission 25 may include a tenth gear 115. The tenth gear 115 may be supported for rotation about the countershaft axis 29. For example, the tenth gear 115 may be fixed on an end of a hollow shaft 116, which is centered on the countershaft axis 29.

Additionally, the transmission 25 may include a fourth clutch 118 of the control set 55. The fourth clutch 118 may be referred to as a "first range clutch" in some embodiments. Like the above-described clutches, the fourth clutch 118 may include at least one first member 120 and at least one second member 122. The first member 120 may be fixed to the hollow shaft 116 for rotation about the countershaft axis 29. The second member 122 may be fixed to a countershaft 124, which is centered on the countershaft axis 29 and which is supported for rotation about the countershaft axis 29. The countershaft 124 may be received within the hollow shaft 116. The first member 120 of the fourth clutch 118 may engage the second member 122 to allow power transmission from the hollow shaft 116 to the countershaft 124. The first and second members 120, 122 may alternatively disengage to cut off this power transmission path.

The transmission 25 may further include an eleventh gear 126. The eleventh gear 126 may be referred to as a "drive gear" in some embodiments. The eleventh gear 126 may be fixed to the countershaft 124 for rotation therewith about the countershaft axis 29.

Additionally, the transmission 25 may include a fifth clutch 128 of the control set 55. The fifth clutch 128 may be referred to as a "second range clutch" in some embodiments. Like the above-described clutches, the fifth clutch 128 may include at least one first member 130 and at least one second member 132. The first member 130 may be fixed to the countershaft 124 for rotation about the countershaft axis 29. The second member 132 may be fixed to an end of a hollow shaft 134. The second member 132 and the hollow shaft 134 may be supported for rotation about the countershaft axis 29. The first member 130 and the second member 132 of the fifth clutch 128 may engage to allow power transmission from the hollow shaft 134 to the countershaft 124. The first and second members 130, 132 may alternatively disengage to cut off this power transmission path.

The transmission 25 may further include a twelfth gear 136. The twelfth gear 136 may be fixed to the hollow shaft 134 on an end that is opposite that of the fifth clutch 128. The twelfth gear 136 may also be engaged with the gear 105.

Additionally, the transmission 25 may include a thirteenth gear 138. The thirteenth gear 138 may be enmeshed with the gear 115 and may be fixed to one end of a hollow shaft 140. The hollow shaft 140 may receive the output shaft 22. The hollow shaft 140 and the thirteenth gear 138 be centered on the output axis 38 and may be supported for rotation about the output axis 38.

Additionally, the transmission 25 may include a sixth clutch 142 of the control set 55. The sixth clutch 142 may be referred to as a "third range clutch" in some embodiments. Like the above-described clutches, the sixth clutch 142 may include at least one first member 144 and at least one second member 146. The first member 144 may be fixed to the hollow shaft 140 for rotation about the output axis 38. The second member 146 may be fixed to a output shaft 22, which is centered on the output axis 38 and which is supported for rotation about the output axis 38. The first member 144 of the sixth clutch 142 may engage the second member 146 to allow power transmission from the hollow shaft 140 to the output shaft 22. The first and second members 144, 146 may alternatively disengage to cut off this power transmission path.

The transmission 25 may further include a fourteenth gear 148. The fourteenth gear 148 may be enmeshed with the twelfth gear 136. The fourteenth gear 148 may also be fixed to a hollow shaft 150, which may be centered on the output axis 22 and which may be supported for rotation about the output axis 38. The hollow shaft 150 may receive the output shaft 22.

Additionally, the transmission 25 may include a seventh clutch 152 of the control set 55. The seventh clutch 152 may be referred to as a "fourth range clutch" in some embodiments. Like the above-described clutches, the seventh clutch 152 may include at least one first member 154 and at least one second member 156. The first member 154 may be fixed to the hollow shaft 150 for rotation about the output axis 38. The second member 156 may be fixed to the output shaft 38. The first member 154 and the second member 156 of the seventh clutch 152 may engage to allow power transmission from the hollow shaft 150 to the output shaft 22. The first and second members 154, 156 may alternatively disengage to cut off this power transmission path.

The transmission 25 may further include a fifteenth gear 158, a hollow shaft 160, and a sixteenth gear 162. The fifteenth gear 158 and the sixteenth gears 162 may be fixed on opposite ends of the hollow shaft 160. The hollow shaft 160 may receive the output shaft 22. The hollow shaft 160, the fifteenth gear 158, and the hollow shaft 160 may be supported for rotation as a unit about the output axis 38. Also, the fifteenth gear 158 may be enmeshed with the eighth gear 88.

The transmission 25 may additionally include a seventeenth gear 164. The seventeenth gear 164 may be enmeshed with the sixteenth gear 162. The seventeenth gear 164 may be fixed on a power take-off (PTO) shaft 166. The PTO shaft 166 may be supported for rotation about a PTO axis 168. The PTO shaft 166 may be considered a second output shaft and may be connected to another power sink, such as an implement of the work vehicle 10, seeding equipment of a trailing vehicle, or other component. The PTO axis 168 may be substantially parallel and spaced apart at a distance from the output axis 38.

Furthermore, the transmission 25 may include an eighteenth gear 170. The eighteenth gear 170 may be enmeshed with the eleventh gear 126. The eighteenth gear 170 may also be operatively attached to an eighth clutch 172. Like the above-described clutches, the eighth clutch 172 may include at least one first member 174 and at least one second member 176. The first member 174 may be fixed to the eighteenth gear 170 (via a hollow shaft or otherwise). The first member 174 and the eighteenth gear 170 may receive the output shaft 22 and may be supported for rotation about the output axis 38. The second member 176 may be fixed to the output shaft 38. The first member 174 and the second member 176 of the eighth clutch 172 may engage to allow power transmission from the eighteenth gear 170 to the output shaft 22. The first and second members 174, 176 may alternatively disengage to cut off this power transmission path.

In some embodiments, the control set 55 of the transmission 25 may provide selection between at least two modes chosen from the following group: 1) an all-CVP creeper mode (including powered-zero); 2) a lower speed split-path field mode; and 3) a higher speed split-path field mode. Each of these may be forward modes for drivingly rotating the output shaft 22 in a forward direction (i.e., for moving the work vehicle 10 forward). The transmission 25 may also provide one or more reverse modes for drivingly rotating the output shaft 22 in a reverse (opposite direction) (i.e., for moving the work vehicle 10 in reverse).

Several example modes will be discussed in relation to the embodiment of FIG. 2. For purposes of brevity, only the first through eighth clutches 54, 64, 80, 118, 128, 142, 152, 172 of the control set 55 will be discussed for providing these modes. However, it will be appreciated that the ninth clutch 182 may be engaged and disengaged as needed. Also, power transmission in these modes will be discussed for delivering power to the output shaft 22.

Specifically, as represented in the illustrated embodiment, the transmission 25 may provide the all-CVP creeper mode (i.e., series mode) when the first, fourth, and eighth clutches 54, 118, 172 are engaged and the second, third, fifth, sixth, and seventh clutches 64, 80, 128, 142, 152 are disengaged. Accordingly, engine power from the engine 20 may transmit from the shaft 36 to the gear 37, to the gear 44, and to the first CVM 30. The first CVM 30 may convert this mechanical input to electrical output for powering the second CVM 34. Meanwhile, the second CVM 34 may drive the shaft 48 and power may transmit from the gear 50, to the gear 52, through the first clutch 54, to the gear 94, to the shaft 95, to the first sun gear 98. In addition, CVM power at the first clutch 55 may simultaneously transfer to the shaft 62, to the gear 72, through the idler gear 74 to the gear 76, through the third clutch 80, to the shaft 90, through the carrier 114, to the first ring gear 100. Accordingly, CVM power from the second CVM 34 may re-combine at the first planet gears 102 to drive the first output member 101. The first output member 101 may output this power through the gear 103, to the gear 115, to the shaft 116, through the fourth clutch 118, to the countershaft 124, to the gear 126, to the gear 170, through the eighth clutch 172, to the output shaft 22. Thus, this mode of the transmission 25 provides power from the CVP 21 to the output shaft 22 and also disconnects the engine 20 from the output shaft 22 (i.e., eliminates the direct mechanical connection of the engine 20 such that the engine 20 is merely powering the generator of the first CVM 30.

The transmission 25 may provide a first split-path forward mode when the third, fourth, and eighth clutches 80, 118 172 are engaged and the first, second, fifth, sixth, and seventh clutches 54, 64, 128, 142, 152 are disengaged. In this mode, engine power from the shaft 36 may transfer to the gear 70, to the gear 88, to the shaft 86, through the third clutch 80 to the shaft 90, to the carrier 114, to drivingly rotate the first ring gear 100. Engine power may also drive the gear 37, and power may transfer to the gear 44, to the shaft 46 to drive the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 95 to drive the first sun gear 98. The variator 40 may sum or combine the engine power (at the first ring gear 100) and the CVP power (at the first sun gear 98) and output combined power via the first planet gears 102 and associated carrier 104 to drivingly rotate the first output member 101. The first output member 101 may transfer this power through the gear 103 to the gear 115, through the fourth clutch 118, to the countershaft 124, to the gear 126, to the gear 170, through the eighth clutch 172, to the output shaft 22. In some embodiments, the speed of the engine 20 may remain constant and the output speed of the second CVM 34 may vary in this mode.

The transmission 25 may additionally provide a second split-path forward mode when the third, fifth, and eighth clutches 80, 128, 172 are engaged and the first, second, fourth, sixth, and seventh clutches 54, 64, 118, 142, 152 are disengaged. In this mode, engine power from the shaft 36 may transfer to the gear 70, to the gear 88, to the shaft 86, through the third clutch 80, to the shaft 90, to the carrier 114, to drivingly rotate the second planet gears 112. Engine power may also drive the gear 37, and power may transfer to the gear 44, to the shaft 46 to drive the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 95 to drive the second sun gear 108. The variator 40 may sum or combine the engine power (at the second planet gears 112) and the CVP power (at the second sun gear 108) and output combined power via the second ring gear 110 to drivingly rotate the second output member 111. The second output member 111 may transfer this power through the gear 105 to the gear 136, through the fifth clutch 128, to the countershaft 124, to the gear 126, to the gear 170, through the eighth clutch 172, to the output shaft 22. In some embodiments, the speed of the engine 20 may remain constant and the output speed of the second CVM 34 may vary in this mode.

Furthermore, the transmission 25 may provide a third split-path forward mode when the third and sixth clutches 80, 142 are engaged and the first, second, fourth, fifth, seventh, and eighth clutches 54, 64, 118, 128, 152, 172 are disengaged. This mode may be substantially the same as the first split-path forward mode discussed above. The power flow path into the variator 40 may be the same, but the flow path out of the variator may be different. Specifically, power at the first output member 101 of the variator 40 may transfer to the gear 103, to the gear 115, to the gear 138, to the shaft 140, through the sixth clutch 142, to the output shaft 22.

Moreover, the transmission 25 may provide a fourth split-path forward mode when the third and seventh clutches 80, 152 are engaged and the first, second, fourth, fifth, sixth, and eighth clutches 54, 64, 118, 128, 142, 172 are disengaged. This mode may be substantially the same as the second split-path forward mode discussed above. The power flow path into the variator 40 may be the same, but the flow path out of the variator may be different. Specifically, power at the second output member 111 of the variator 40 may transfer to the gear 105, to the gear 136, to the gear 148, to the shaft 150, through the seventh clutch 152, to the output shaft 22.

Additionally, the transmission 25 may provide a plurality of reverse modes. In some embodiments, there may be a corresponding number of forward and reverse split-path modes. The control set 55 may provide the reverse modes similar to the forward modes discussed above, except that the second clutch 64 is engaged instead of the third clutch 80 in each. For example, a first split-path reverse mode may be provided when the second, fourth, and eighth clutches 64, 118, 172 are engaged and the first, third, fifth, sixth, and seventh clutches 54, 80, 128, 142, 152 are disengaged. Accordingly, engine power from the shaft 36 may transfer through the second clutch 64, to the gear 72, to the idler gear 74, to the gear 76, to the shaft 90, to the carrier 114, to drivingly rotate the first ring gear 100. Engine power may also drive the gear 37, and power may transfer to the gear 44, to the shaft 46 to drive the first CVM 30. Electrical power may be generated for powering the second CVM 34. Mechanical power from the second CVM 34 (i.e., from the shaft 48) may drive the gear 50, and this power may transmit to the gear 52, through the gear 94 and the shaft 95 to drive the first sun gear 98. As discussed above, the variator 40 may output combined power via the first planet gears 102 and associated carrier 104 to drivingly rotate the first output member 101. The first output member 101 may transfer this power through the gear 103 to the gear 115, through the fourth clutch 118, to the countershaft 124, to the gear 126, to the gear 170, through the eighth clutch 172, to the output shaft 22. The other reverse modes may be provided in a similar fashion.

It will be appreciated that, in one or more of these modes, the powertrain 12 may provide power to the PTO shaft 166 as well. For example, in the forward modes discussed above in which the third clutch 80 is engaged, power at the third clutch 80 may transfer via the hollow shaft 86 to the gear 88, to the gear 158, across the hollow shaft 160, to the gear 162, to the gear 164 to the PTO shaft 166. Alternatively, in the reverse modes discussed above in which the second clutch 64 is engaged, power at the second clutch 64 may transfer from the gear 70 to the gear 88, to the gear 158, across the hollow shaft 160, to the gear 162, to the gear 164, to the PTO shaft 166.

Thus, the transmission 25 provides a plurality of modes that may be useful in different conditions. The operator may select between these different modes and/or the transmission 25 may automatically shift between these modes to maintain high operating efficiency in a number of different operating conditions.

Also, the transmission 25 may be constructed and arranged in a well-organized and compact manner. The majority of the components of the transmission 25 may be compactly and co-axially arranged about either the input axis 27, the variator axis 41, the countershaft axis 29, and the output axis 38. Also, these components may be arranged in a number of orientations as represented in the end views of the transmission 25 shown in FIGS. 3-6.

In the first orientation of FIG. 3, for example, the input assembly 24 (including the first clutch 55, the second clutch 64, the engine shaft 36, the shaft 62, the gear 70, the gear 52, and/or other components) may be centered about the input axis 27. The variator assembly 39 (including the third clutch 80, the variator 40, and/or other components) may be centered about the variator axis 41. The countershaft assembly 26 (including the fourth clutch 118, the fifth clutch 128, the countershaft 124, and/or other components) may be centered about the countershaft axis 29. The output assembly 28 (including the sixth clutch 142, the seventh clutch 152, the eighth clutch 172, the output shaft 22, and/or other components) may be centered about the output axis 38. As shown, the input axis 27 and the variator axis 41 may be disposed at a first horizontal distance and a first vertical distance. Likewise, the countershaft axis 29 and the variator axis 41 may be disposed at a second horizontal distance and a second vertical distance. Also, the output axis 38 and the countershaft axis 29 may be disposed at a third horizontal distance and a third vertical distance.

In two different orientations, the position of at least one of the axes 27, 41, 29, 38 may be different with respect to a neighboring one of the axes 27, 41, 29, 38. For example, the variator axis 41 with respect to the neighboring input axis 27 may be different in the different orientations.

For purposes of reference, a horizontal reference line 192 and a vertical reference line 194 intersect at the input axis 27. These reference lines 192, 194 divide the area into four quadrants, wherein a first quadrant is indicated with roman numeral I, a second quadrant is indicated with roman numeral II, a third quadrant is indicated with roman numeral III, and a fourth quadrant is indicated with roman numeral IV.

As shown, in the orientation of FIG. 3, the variator axis 41 may be disposed within the fourth quadrant (IV) with respect to the input axis 27. Also, the variator axis 41 may be disposed at a radial distance from the input axis 27, and the radial distance may be equal to the length of the arrow 196. Furthermore, the variator axis 41 may be disposed at an angular position 190' with respect to the horizontal reference line 192 of the input axis 27. The angular position 190" of FIG. 4 may be slightly smaller than the angular position 190' of FIG. 3. Furthermore, the variator axis 41 may be disposed at an even smaller angle 190''' in the third orientation of FIG. 5. Moreover, the angular position 190'''' of FIG. 6 may be smaller still.

Figure 6:
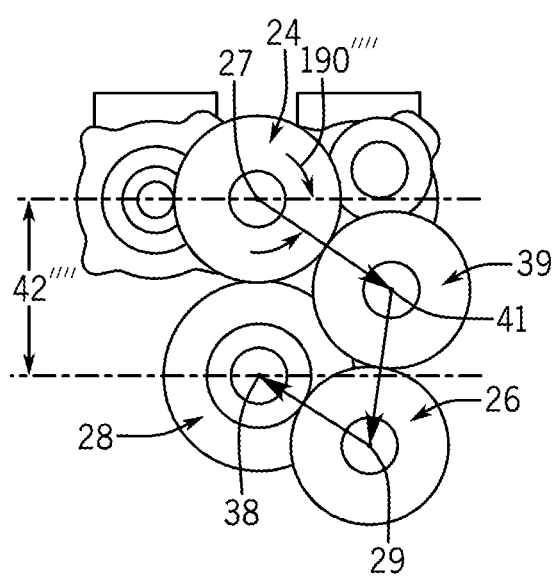
FIG. 6 is a schematic end view of the CVT of FIG. 2 in a fourth orientation.

Similarly, the countershaft axis 29 may be disposed in different angular positions with respect to the variator axis 41. As shown in FIGS. 3, 4, and 6, the countershaft axis 29 may be disposed within the third quadrant with respect to the variator axis 41, or as shown in FIG. 5, the countershaft axis 29 may be disposed within the fourth quadrant with respect to the variator axis 41. In other words, the countershaft axis 29 may be disposed on opposite horizontal sides of the variator axis 41 in different orientations of the transmission 25.

Furthermore, the output axis 38 may be disposed in different angular positions with respect to the countershaft axis 29. As shown in FIGS. 3 and 4, the output axis 38 may be disposed within the fourth quadrant with respect to the countershaft axis 29, or as shown in FIGS. 5 and 6, the output axis 38 may be disposed within the second quadrant with respect to the countershaft axis 29. In other words, the output axis 38 may be disposed on opposite horizontal sides and/or opposite vertical sides of the countershaft axis 29 in different orientations of the transmission 25.

Moreover, power flow through the transmission 25 from the input assembly 24 to the output assembly 28 is represented schematically by a series of arrows including a first arrow 196, a second arrow 198, and a third arrow 200. The arrow 196 is straight and begins at the input axis 27 and ends at the variator axis 41. The arrow 198 is straight and begins at the variator axis 41 and ends at the countershaft axis 29. The arrow 200 is straight and begins at the countershaft axis 29 and ends at the output axis 38. It will be appreciated that these arrows 196, 198, 200 collectively represent a projection of the power flow path onto an imaginary vertical plane.

As shown, the powerflow path collectively represented by the arrows 196, 198, 200 may be non-linear with the variator axis 41 and the countershaft axis 29 being inflection points. For example, as shown in FIGS. 3 and 4, the path may be substantially Z-shaped and zig-zagged. Alternatively, as shown in FIGS. 5 and 6, the path may be substantially reverse C-shaped.

Accordingly, the packaging and overall dimensions of the transmission 25 may be highly variable. As shown, the vertical drop distance 42', 42", 42''', 42'''' may vary greatly between the different orientations. This variability allows the transmission 25 to be tailored to fit within a particular work vehicle 10

Also, the following examples are provided, which are numbered for easier reference.

1. A powertrain for a work vehicle comprising: an engine; a continuously variable power source (CVP); an output shaft; and a transmission that operably connects the engine and the CVP to the output shaft, the transmission configured to provide selection between a plurality of transmission modes in which the transmission transmits power from at least one of the engine and the CVP to the output shaft, the transmission including: an input assembly defining an input axis and having at least one input transmission component that is supported for rotation about the input axis, the engine connected to the input assembly and configured to input engine power thereto for rotating the at least one input transmission component, the CVP connected to the input assembly and configured to input CVP power thereto for rotating the at least one input transmission component; a variator assembly defining a variator axis, the variator assembly including a variator with at least one variator component that is supported for rotation about the variator axis, the variator assembly in at least one of the plurality of transmission modes configured to receive engine power and CVP power via the input assembly and to output combined power; a countershaft assembly defining a countershaft axis and including at least one countershaft component that is supported for rotation about the countershaft axis, the countershaft assembly configured to receive combined power from the variator for rotating the at least one countershaft component; and an output assembly defining an output axis, the output assembly connected to the output shaft, the output assembly configured to receive combined power from the countershaft assembly to drive the output shaft in rotation about the output axis; wherein the input axis, the variator axis, the countershaft axis, and the output axis are substantially parallel and arranged in a series that extends vertically, the series having a plurality of orientations in which the input assembly, the variator assembly, the countershaft assembly, and the output assembly are alternatively arranged; and wherein the input assembly, the variator assembly, the countershaft assembly, and the output assembly are the same in different ones of the plurality of orientations and a vertical drop distance from the input axis to the output axis varies between the different ones of the plurality of orientations.

2. The powertrain of example 1, wherein the series has a first orientation and a second orientation; and wherein, in the first orientation, one of the input axis, the variator axis, the countershaft axis, and the output axis is disposed in a first angular position relative to a neighboring one of the input axis, the variator axis, the countershaft axis, and the output axis; and wherein, in the second orientation, the one is disposed in a second angular position relative to the neighboring one.

3. The powertrain of example 2, wherein, in the first orientation, the countershaft axis is disposed at a first vertical side of the output axis; and wherein, in the second orientation, the countershaft axis is disposed at a second vertical side of the output axis opposite the first vertical side.

4. The powertrain of example 1, wherein the transmission is configured is configured for power flow through the transmission along a path from the input assembly, through the variator assembly and the countershaft assembly, to the output assembly; and wherein, in a projection of the path onto an imaginary vertical plane, the variator axis is a first inflection point of the path and the countershaft axis is a second inflection point of the path.

5. The powertrain of example 1, wherein the input assembly includes a first shaft and a second shaft that are supported for rotation on the input axis; wherein the engine is connected to the first shaft to provide engine power thereto; and wherein the CVP is connected to the second shaft to provide CVP power thereto.

6. The powertrain of example 5, wherein the second shaft surrounds at least part of the first shaft; and wherein the first and second shaft are coaxial about the input axis.

7. The powertrain of example 1, wherein the plurality of transmission modes includes a series transmission mode in which: the transmission is configured to disconnect the engine from the variator; the variator is configured to receive CVP power from the CVP; and the variator is configured to output CVP power.

8. The powertrain of example 7, wherein the series transmission mode is configured transmit power for providing torque to the output shaft while maintaining the output shaft stationary.

9. The powertrain of example 7, wherein the CVP includes a first continuously variable machine (CVM) and a second CVM; wherein, in the series transmission mode: the engine provides power to the first CVM to generate power that is supplied to the second CVM; the second CVM provides power to a first input member of the variator; the second CVM provides power to a second input member of the variator; and the variator recombines power from the first and second input members that is output to the countershaft assembly.

10. The powertrain of example 1, wherein the input axis and the variator axis are spaced apart at a first horizontal distance and a first vertical distance; wherein the variator axis and the countershaft axis are spaced apart at a second horizontal distance and a second vertical distance; and wherein the countershaft axis and the output axis are spaced apart at a third horizontal distance and a third vertical distance.

11. A method of manufacturing a powertrain for a work vehicle, the method comprising: providing an engine, a continuously variable power source (CVP), and an output shaft; providing a transmission configured to operably connect the engine and the CVP to the output shaft, the transmission configured to provide selection between a plurality of transmission modes in which the transmission transmits power from at least one of the engine and the CVP to the output shaft, the transmission including: an input assembly defining an input axis and having at least one input transmission component that is supported for rotation about the input axis, the engine connected to the input assembly and configured to input engine power thereto for rotating the at least one input transmission component, the CVP connected to the input assembly and configured to input CVP power thereto for rotating the at least one input transmission component; a variator assembly defining a variator axis, the variator assembly including a variator with at least one variator component that is supported for rotation about the variator axis, the variator assembly in at least one of the plurality of transmission modes configured to receive engine power and CVP power via the input assembly and to output combined power; a countershaft assembly defining a countershaft axis and including at least one countershaft component that is supported for rotation about the countershaft axis, the countershaft assembly configured to receive combined power from the variator for rotating the at least one countershaft component; and an output assembly defining an output axis, the output assembly connected to the output shaft, the output assembly configured to receive combined power from the countershaft assembly to drive the output shaft in rotation about the output axis; wherein the input axis, the variator axis, the countershaft axis, and the output axis are substantially parallel and arranged in a series that extends vertically, the series having a plurality of orientations in which the input assembly, the variator assembly, the countershaft assembly, and the output assembly are alternatively arranged; wherein the input assembly, the variator assembly, the countershaft assembly, and the output assembly are the same in different ones of the plurality of orientations; and wherein a vertical drop distance from the input axis to the output axis varies between the different ones of the plurality of orientations; selecting one of the plurality of orientations of the series; and arranging the transmission according to the selected one of the plurality of orientations to provide the transmission with the vertical drop distance associated with the selected one of the plurality of orientations.

12. The method of example 11, further comprising selecting between a first orientation and a second orientation of the series; wherein, in the first orientation, one of the input axis, the variator axis, the countershaft axis, and the output axis is disposed in a first angular position relative to a neighboring one of the input axis, the variator axis, the countershaft axis, and the output axis; and wherein, in the second orientation, the one is disposed in a second angular position relative to the neighboring one.

13. The method of example 12, wherein, in the first orientation, the countershaft axis is disposed at a first vertical side of the output axis; and wherein, in the second orientation, the countershaft axis is disposed at a second vertical side of the output axis opposite the first vertical side.

14. The method of example 11, wherein arranging the transmission includes assembling the transmission for power flow through the transmission along a path from the input assembly, through the variator assembly and the countershaft assembly, to the output assembly; and wherein, in a projection of the path onto an imaginary vertical plane, the variator axis is a first inflection point of the path and the countershaft axis is a second inflection point of the path.

15. The method of example 11, wherein the plurality of transmission modes includes a series transmission mode in which: the transmission is configured to disconnect the engine from the variator; the variator is configured to receive CVP power from the CVP; and the variator is configured to output CVP power.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A powertrain for a work vehicle comprising:
an engine;
a continuously variable power source (CVP);
an output shaft; and
a transmission that operably connects the engine and the CVP to the output shaft, the transmission configured to provide selection between a plurality of transmission modes in which the transmission transmits power from at least one of the engine and the CVP to the output shaft, the transmission including:
an input assembly defining an input axis and having at least one input transmission component that is supported for rotation about the input axis, the engine connected to the input assembly and configured to input engine power thereto for rotating the at least one input transmission component, the CVP connected to the input assembly and configured to input CVP power thereto for rotating the at least one input transmission component;

a variator assembly defining a variator axis, the variator assembly including a variator with at least one variator component that is supported for rotation about the variator axis, the variator assembly in at least one of the plurality of transmission modes configured to receive engine power and CVP power via the input assembly and to output combined power;

a countershaft assembly defining a countershaft axis and including at least one countershaft component that is supported for rotation about the countershaft axis, the countershaft assembly configured to receive combined power from the variator for rotating the at least one countershaft component; and an output assembly defining an output axis, the output assembly connected to the output shaft, the output assembly configured to receive combined power from the countershaft assembly to drive the output shaft in rotation about the output axis;

wherein the input axis, the variator axis, the countershaft axis, and the output axis are substantially parallel and arranged in a series that extends vertically, the series having a plurality of orientations in which the input assembly, the variator assembly, the countershaft assembly, and the output assembly are alternatively arranged; and wherein the input assembly, the variator assembly, the countershaft assembly, and the output assembly are the same in different ones of the plurality of orientations and a vertical drop distance from the input axis to the output axis varies between the different ones of the plurality of orientations.

2. The powertrain of claim 1, wherein the series has a first orientation and a second orientation; and wherein, in the first orientation, one of the input axis, the variator axis, the countershaft axis, and the output axis is disposed in a first angular position relative to a neighboring one of the input axis, the variator axis, the countershaft axis, and the output axis; and wherein, in the second orientation, the one is disposed in a second angular position relative to the neighboring one.

3. The powertrain of claim 2, wherein, in the first orientation, the countershaft axis is disposed at a first vertical side of the output axis; and wherein, in the second orientation, the countershaft axis is disposed at a second vertical side of the output axis opposite the first vertical side.

4. The powertrain of claim 1, wherein the transmission is configured is configured for power flow through the transmission along a path from the input assembly, through the variator assembly and the countershaft assembly, to the output assembly; and wherein, in a projection of the path onto an imaginary vertical plane, the variator axis is a first inflection point of the path and the countershaft axis is a second inflection point of the path.

5. The powertrain of claim 4, wherein the path is substantially Z-shaped.

6. The powertrain of claim 4, wherein the path is substantially C-shaped.

7. The powertrain of claim 1, wherein the input assembly includes a first shaft and a second shaft that are supported for rotation on the input axis;

wherein the engine is connected to the first shaft to provide engine power thereto;

wherein the CVP is connected to the second shaft to provide CVP power thereto.

8. The powertrain of claim 7, wherein the second shaft surrounds at least part of the first shaft; and wherein the first and second shaft are coaxial about the input axis.

9. The powertrain of claim 1, wherein the plurality of transmission modes includes a series transmission mode in which:

the transmission is configured to disconnect the engine from the variator;

the variator is configured to receive CVP power from the CVP; and the variator is configured to output CVP power.

10. The powertrain of claim 9, wherein the series transmission mode is configured transmit power for providing torque to the output shaft while maintaining the output shaft stationary.

11. The powertrain of claim 9, wherein the CVP includes a first continuously variable machine (CVM) and a second CVM;

wherein, in the series transmission mode:

the engine provides power to the first CVM to generate power that is supplied to the second CVM;

the second CVM provides power to a first input member of the variator;

the second CVM provides power to a second input member of the variator; and the variator recombines power from the first and second input members that is output to the countershaft assembly.

12. The powertrain of claim 1, wherein the input axis and the variator axis are spaced apart at a first horizontal distance and a first vertical distance;

wherein the variator axis and the countershaft axis are spaced apart at a second horizontal distance and a second vertical distance; and wherein the countershaft axis and the output axis are spaced apart at a third horizontal distance and a third vertical distance.

13. A method of manufacturing a powertrain for a work vehicle, the method comprising:

providing an engine, a continuously variable power source (CVP), and an output shaft;

providing a transmission configured to operably connect the engine and the CVP to the output shaft, the transmission configured to provide selection between a plurality of transmission modes in which the transmission transmits power from at least one of the engine and the CVP to the output shaft, the transmission including:

an input assembly defining an input axis and having at least one input transmission component that is supported for rotation about the input axis, the engine connected to the input assembly and configured to input engine power thereto for rotating the at least one input transmission component, the CVP connected to the input assembly and configured to input CVP power thereto for rotating the at least one input transmission component;

a variator assembly defining a variator axis, the variator assembly including a variator with at least one variator component that is supported for rotation about the variator axis, the variator assembly in at least one of the plurality of transmission modes configured to receive engine power and CVP power via the input assembly and to output combined power;

a countershaft assembly defining a countershaft axis and including at least one countershaft component that is supported for rotation about the countershaft axis, the countershaft assembly configured to receive combined power from the variator for rotating the at least one countershaft component; and an output assembly defining an output axis, the output assembly connected to the output shaft, the output assembly configured to receive combined power from the countershaft assembly to drive the output shaft in rotation about the output axis;

wherein the input axis, the variator axis, the countershaft axis, and the output axis are substantially parallel and arranged in a series that extends vertically, the series having a plurality of orientations in which the input assembly, the variator assembly, the countershaft assembly, and the output assembly are alternatively arranged;

wherein the input assembly, the variator assembly, the countershaft assembly, and the output assembly are the same in different ones of the plurality of orientations; and wherein a vertical drop distance from the input axis to the output axis varies between the different ones of the plurality of orientations;

selecting one of the plurality of orientations of the series; and arranging the transmission according to the selected one of the plurality of orientations to provide the transmission with the vertical drop distance associated with the selected one of the plurality of orientations.

14. The method of claim 13, further comprising selecting between a first orientation and a second orientation of the series;

wherein, in the first orientation, one of the input axis, the variator axis, the countershaft axis, and the output axis is disposed in a first angular position relative to a neighboring one of the input axis, the variator axis, the countershaft axis, and the output axis; and wherein, in the second orientation, the one is disposed in a second angular position relative to the neighboring one.

15. The method of claim 14, wherein, in the first orientation, the countershaft axis is disposed at a first vertical side of the output axis; and wherein, in the second orientation, the countershaft axis is disposed at a second vertical side of the output axis opposite the first vertical side.

16. The method of claim 13, wherein arranging the transmission includes assembling the transmission for power flow through the transmission along a path from the input assembly, through the variator assembly and the countershaft assembly, to the output assembly; and wherein, in a projection of the path onto an imaginary vertical plane, the variator axis is a first inflection point of the path and the countershaft axis is a second inflection point of the path.

17. The method of claim 16, wherein the path is substantially Z-shaped.

18. The method of claim 16, wherein the path is substantially C-shaped.

19. The method of claim 13, wherein the input assembly includes a first shaft and a second shaft that are supported for rotation on the input axis;

wherein the engine is connected to the first shaft to provide engine power thereto;

wherein the CVP is connected to the second shaft to provide CVP power thereto.

20. The method of claim 13, wherein the plurality of transmission modes includes a series transmission mode in which:

the transmission is configured to disconnect the engine from the variator;

the variator is configured to receive CVP power from the CVP; and the variator is configured to output CVP power.

* * * * *

UNITED STATES PATENT AND TRADEMARK OFFICE
CERTIFICATE OF CORRECTION

PATENT NO. : 11,091,018 B2
APPLICATION NO. : 15/977242
DATED : August 17, 2021
INVENTOR(S) : Ore et al.

Page 1 of 1

It is certified that error appears in the above-identified patent and that said Letters Patent is hereby corrected as shown below:

In the Claims

In Column 21, Claim 4, Line 51, delete "is configured is configured" and insert -- is configured --, therefor.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*